United States Patent
Matsuyama et al.

(10) Patent No.: US 12,122,338 B2
(45) Date of Patent: Oct. 22, 2024

(54) BRAKE CONTROL SYSTEM, ONBOARD DEVICE CONTROL SYSTEM, BRAKE CONTROL METHOD, AND ONBOARD DEVICE CONTROL METHOD

(71) Applicant: Mitsubishi Electric Corporation, Tokyo (JP)

(72) Inventors: Etsuji Matsuyama, Tokyo (JP); Makoto Nishigaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 17/627,977

(22) PCT Filed: Aug. 8, 2019

(86) PCT No.: PCT/JP2019/031430
§ 371 (c)(1),
(2) Date: Jan. 18, 2022

(87) PCT Pub. No.: WO2021/024469
PCT Pub. Date: Feb. 11, 2021

(65) Prior Publication Data
US 2022/0274580 A1    Sep. 1, 2022

(51) Int. Cl.
*B60T 17/22* (2006.01)
*B61H 13/20* (2006.01)

(52) U.S. Cl.
CPC ............ *B60T 17/228* (2013.01); *B61H 13/20* (2013.01)

(58) Field of Classification Search
None
See application file for complete search history.

(56) References Cited

U.S. PATENT DOCUMENTS

| | | | |
|---|---|---|---|
| 2018/0050711 A1* | 2/2018 | Rice | B61L 15/0081 |
| 2020/0145437 A1 | 5/2020 | Torisaki et al. | |
| 2020/0156604 A1* | 5/2020 | Liu | B60T 13/665 |

FOREIGN PATENT DOCUMENTS

| | | | | |
|---|---|---|---|---|
| CN | 105329266 A | * | 2/2016 | B61L 27/00 |
| CN | 107867269 A | * | 4/2018 | B60T 7/124 |
| JP | 3705897 B2 | | 10/2005 | |

(Continued)

OTHER PUBLICATIONS

Machine translation of CN-105329266-A (Year: 2016).*

(Continued)

*Primary Examiner* — Amelia Vorce
*Assistant Examiner* — Kyle S Park
(74) *Attorney, Agent, or Firm* — Buchanan Ingersoll & Rooney PC

(57) ABSTRACT

A brake control system to be installed on a railroad car, the system including: a brake command unit that outputs a first brake command by a first communication method and outputs a second brake command by a second communication method, the first brake command indicating details of control of a brake, the second brake command restricting details of control of the brake; and a brake control unit that acquires the first brake command by the first communication method via a train control and monitoring system, acquires the second brake command by the second communication method, and controls the brake based on the first brake command and the second brake command.

20 Claims, 7 Drawing Sheets

(56) References Cited

FOREIGN PATENT DOCUMENTS

JP        2008143365  A    6/2008
JP        2019022210  A    2/2019

OTHER PUBLICATIONS

Machine translation of CN-107867269-A (Year: 2018).*
Office Action issued in Indian Application No. 202227005637; Mailed Jul. 1, 2022. 6 Pages.
International Search Report (PCT/ISA/210) with English translation and Written Opinion (PCT/ISA/237) mailed on Oct. 29, 2019, by the Japan Patent Office as the International Searching Authority for International Application No. PCT/JP2019/031430.

* cited by examiner

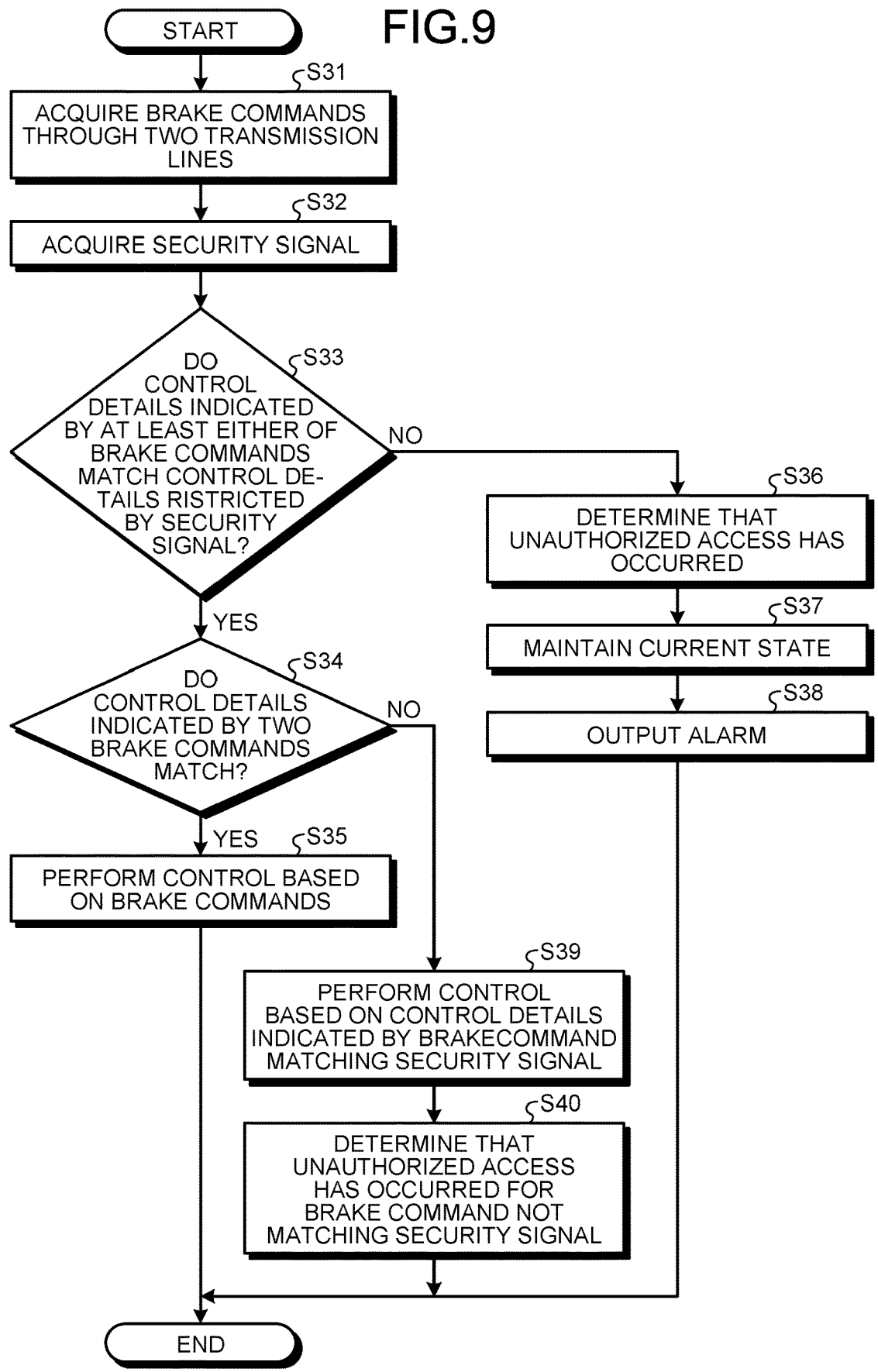

BRAKE CONTROL SYSTEM, ONBOARD DEVICE CONTROL SYSTEM, BRAKE CONTROL METHOD, AND ONBOARD DEVICE CONTROL METHOD

FIELD

The present invention relates to a brake control system and an onboard device control system to be installed on a railroad car, a brake control method, and an onboard device control method.

BACKGROUND

Conventionally, in a railroad car, an arithmetic unit of a train information management device collectively manages power running, brake control, and the like of the car. Patent Literature 1 discloses a technique in which an arithmetic unit of a train information management device calculates required air brake force, and a brake controller controls a brake control valve based on the required air brake force. Patent Literature 1 discloses communication between the arithmetic unit of the train information management device and the brake controller to be performed via a communication interface such as Recommended Standard (RS) 485.

CITATION LIST

Patent Literature

Patent Literature 1: Japanese Patent Application Laid-open No. 2008-143365

SUMMARY

Technical Problem

In recent years, introduction of Ethernet (registered trademark) into communication between onboard devices installed on railroad cars has been considered. Introduction of Ethernet into railroad cars enables an increase in transmission capacity while reducing the number of wires between onboard devices of the railroad cars. However, a communication method based on Ethernet may involve connection to an open network. In this case, malfunction of an onboard device may be caused by unauthorized access by a malicious third party.

The present invention has been made in view of the above, and an object of the present invention is to obtain a brake control system capable of avoiding malfunction due to unauthorized access.

Solution to Problem

A brake control system according to an aspect of the present invention to be installed on a railroad car is provided. The system includes: a brake command unit to output a first brake command by a first communication method and output a second brake command by a second communication method, the first brake command indicating details of control of a brake, the second brake command restricting details of control of the brake and a brake control unit to acquire the first brake command by the first communication method via a train control and monitoring system, acquire the second brake command by the second communication method, and control the brake based on the first brake command and the second brake command.

Advantageous Effects of Invention

According to the present invention, a brake control system has the effect of avoiding malfunction due to unauthorized access.

BRIEF DESCRIPTION OF DRAWINGS

FIG. 9 is a flowchart illustrating operation to be performed by the brake control system according to the third embodiment after power activation.

DESCRIPTION OF EMBODIMENTS

Hereinafter, a brake control system, an onboard device control system, a brake control method, and an onboard device control method according to each embodiment of the present invention will be described in detail with reference to the drawings. Note that the present invention is not limited to the embodiments.

First Embodiment

Figure 1:
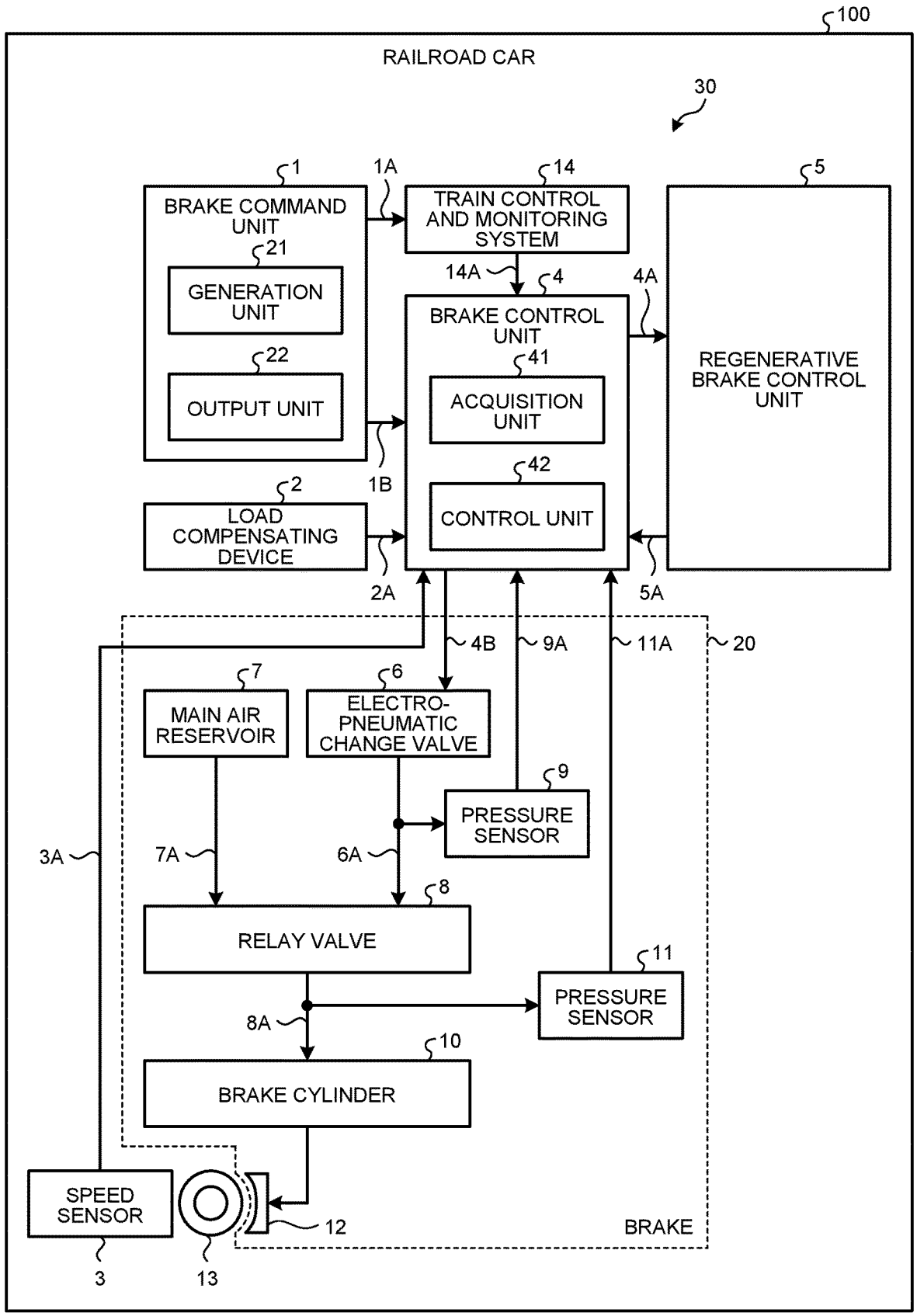
FIG. 1 is a diagram showing a configuration example of a brake control system according to a first embodiment.

FIG. 1 is a diagram showing a configuration example of a brake control system 30 according to a first embodiment of the present invention. The brake control system 30 is a system that is installed on a railroad car 100, and controls a brake 20 of the railroad car 100. The brake control system 30 includes a brake command unit 1, a load compensating device 2, a speed sensor 3, a brake control unit 4, a regenerative brake control unit 5, an electropneumatic change valve 6, a main air reservoir 7, a relay valve 8, a pressure sensor 9, a brake cylinder 10, a pressure sensor 11, a brake shoe 12, a wheel 13, and a train control and monitoring system 14. The electropneumatic change valve 6, the main air reservoir 7, the relay valve 8, the pressure sensor 9, the brake cylinder 10, the pressure sensor 11, and the brake shoe 12 are included in the brake 20. Note that the railroad car 100 actually includes a plurality of the speed sensors 3, a plurality of the brake control units 4, a plurality of the wheels 13, and a plurality of the brakes 20. In addition, when a train includes a plurality of the railroad cars 100, some constituent elements such as the brake command unit 1 may be installed only on specific railroad cars such as the front car and the rear car of the train.

The brake command unit 1 is installed in a cab (not illustrated) or the like of the railroad car 100, and generates and outputs a brake command 1A indicating details of control of the brake 20. The details of control of the brake 20 include control for applying the brake 20, control for releasing the brake 20, and the like. The control for applying the brake 20 refers to control for decelerating the railroad car 100, which is so-called control for putting on the brake. The control for releasing the brake 20 refers to control for allowing the railroad car 100 to increase its speed, which is so-called control for releasing application of the brake. The brake command unit 1 may receive an operation from a train driver or the like and generate the brake command 1A corresponding to details of the received operation. In addition, the brake command unit 1 generates and outputs a security signal 1B for restricting details of control to be performed by the brake control unit 4. The brake command unit 1 outputs the brake command 1A to the train control and monitoring system 14 by a first communication method, and outputs the security signal 1B to the brake control unit 4 by a second communication method. The first communication method is a communication method larger in transmission capacity than the second communication method. Examples of the first communication method include Ethernet. The second communication method is a communication method smaller in transmission capacity than the first communication method. Examples of the second communication method include a communication method based on RS 485 or the like that has been used for conventional communication. The following description is based on the assumption that the first communication method is Ethernet, and the second communication method is RS 485. Furthermore, in the following description, the brake command 1A may be referred to as a first brake command, and the security signal 1B may be referred to as a second brake command.

As illustrated in FIG. 1, the brake command unit 1 includes a generation unit 21 and an output unit 22. The generation unit 21 generates the brake command 1A and the security signal 1B. The output unit 22 outputs the brake command 1A and the security signal 1B. In order to simplify description, description will be provided below with a focus on the brake command unit 1.

The load compensating device 2 generates a load compensation signal 2A by using an air spring pressure sensor (not illustrated) or the like, and outputs the load compensation signal 2A. The load compensation signal 2A indicates a pressure applied by passengers or the like to the railroad car 100.

The speed sensor 3 is a sensor that generates a speed signal 3A based on the rotation speed of the wheel 13, and outputs the speed signal 3A. The speed signal 3A indicates the speed of the railroad car 100. Note that although not illustrated in FIG. 1, the speed sensor 3 is installed on each of the front and rear trucks of the railroad car 100, so that it is possible to detect a speed from each wheel 13 in the railroad car 100.

The brake control unit 4 serves, in the railroad car 100, as a brake control device that presses the brake shoe 12 against the wheel 13 to generate a braking force. The brake control unit 4 includes an acquisition unit 41 and a control unit 42.

The acquisition unit 41 acquires the security signal 1B from the brake command unit 1 by the second communication method, acquires the load compensation signal 2A from the load compensating device 2, and acquires the speed signal 3A from the speed sensor 3. In addition, the acquisition unit 41 acquires a regenerative feedback signal 5A from the regenerative brake control unit 5, acquires a feedback command 9A for air cylinder (AC) pressure from the pressure sensor 9, and acquires a feedback command 11A for brake cylinder (BC) pressure from the pressure sensor 11. The AC pressure is a command pressure of an air signal 6A output from the electropneumatic change valve 6. The BC pressure is a brake cylinder pressure 8A of the relay valve 8. In addition, the acquisition unit 41 acquires the brake command 1A from the train control and monitoring system 14 through Ethernet transmission 14A, the brake command 1A having been output from the brake command unit 1. That is, the acquisition unit 41 acquires the brake command 1A by the first communication method via the train control and monitoring system 14.

The control unit 42 calculates necessary brake force for the railroad car 100 based on the brake command 1A, the security signal 1B, the load compensation signal 2A, and the speed signal 3A, and outputs a regenerative pattern signal 4A indicating the necessary brake force for the railroad car 100. The control unit 42 generates and outputs a pressure control signal 4B indicating an air brake supplement amount obtained by subtraction of the value of the regenerative feedback signal 5A from the necessary brake force for the railroad car 100. Furthermore, the control unit 42 controls the brake 20 based on the brake command 1A and the security signal 1B. Specifically, when control details indicated by the brake command 1A match control details restricted by the security signal 1B, the control unit 42 controls the brake 20 as indicated by the brake command 1A. When the control details indicated by the brake command 1A do not match the control details restricted by the security signal 1B, the control unit 42 maintains the current state of the brake 20.

The regenerative brake control unit 5 calculates actual regenerative brake force corresponding to actual torque on the basis of the regenerative pattern signal 4A, and generates and outputs the regenerative feedback signal 5A indicating the actual regenerative brake force.

The electropneumatic change valve 6 converts a control signal of the pressure control signal 4B, which is an electric signal output from the control unit 42 of the brake control unit 4, into the air signal 6A indicating control details with air pressure.

The main air reservoir 7 is an air tank that outputs compressed air 7A, The compressed air 7A is air having been stored and compressed.

The relay valve 8 outputs the compressed air 7A at a pressure corresponding to a command pressure that is the air pressure of the air signal 6A output from the electropneumatic change valve 6. As a result, the relay valve 8 outputs, to the brake cylinder 10, air at a pressure of the brake cylinder pressure 8A in accordance with the command pressure of the air signal 6A. The brake cylinder pressure 8A is obtained by amplification of the air signal 6A with the compressed air 7A. The brake cylinder pressure 8A and the command pressure of the air signal 6A are in a direct proportional relationship in which as the command pressure of the air signal 6A increases or decreases, the brake cylinder pressure 8A also increases or decreases.

The pressure sensor 9 is a sensor that detects the command pressure that is the air pressure of the air signal 6A. The command pressure is a physical quantity indicating a force of pressing the brake shoe 12 against the wheel 13. The pressure sensor 9 returns the detected command pressure of the air signal 6A as the feedback command 9A to the brake control unit 4.

The brake cylinder 10 presses the brake shoe 12 against the wheel 13 due to the brake cylinder pressure 8A.

The pressure sensor 11 is a sensor that detects the brake cylinder pressure 8A which is the air pressure of the brake cylinder 10. The brake cylinder pressure 8A is a physical quantity indicating a force of pressing the brake shoe 12 against the wheel 13. The pressure sensor 11 returns the detected brake cylinder pressure 8A as the feedback command 11A to the brake control unit 4.

The brake shoe 12 has a friction coefficient. The brake shoe 12 is pressed against the wheel 13 by the brake cylinder 10 to generate a brake force, that is, a braking force. The brake force in the brake control system 30 can be calculated as the product of the friction coefficient of the brake shoe 12 and the brake cylinder pressure 8A.

The brake cylinder 10 presses the brake shoe 12 against the wheel 13, so that the wheel 13 generates a brake force, that is, a braking force.

The train control and monitoring system 14 manages the states of onboard devices installed on the railroad car 100. The train control and monitoring system 14 communicates with onboard devices such as the brake command unit 1 and the brake control unit 4 by the first communication method, that is, Ethernet. In the example of FIG. 1, the train control and monitoring system 14 outputs the brake command 1A acquired from the brake command unit 1, to the brake control unit 4 through the Ethernet transmission 14A.

Next, operation of the brake control system 30 will be described. In the brake control system 30, the train control and monitoring system 14 communicates with each onboard device via Ethernet as described above. Ethernet is larger in transmission capacity than RS 485 and the like. Meanwhile, Ethernet may be connected to an open network. When connected to an open network, Ethernet may be subjected to unauthorized access by a malicious third party. In particular, when the brake control unit 4 is subjected to unauthorized access, there arises a problem that the brake 20 does not work.

Therefore, in the present embodiment, the brake command unit 1 outputs the brake command 1A to the brake control unit 4 via the train control and monitoring system 14, and also outputs the security signal 1B that restricts details of control of the brake 20 directly to the brake control unit 4. When control details indicated by the brake command 1A acquired from the brake command unit 1 via the train control and monitoring system 14 match the control details restricted by the security signal 1B directly acquired from the brake command unit 1, the brake control unit 4 controls the brake 20 based on the brake command 1A. When the control details indicated by the brake command 1A acquired from the brake command unit 1 via the train control and monitoring system 14 do not match the control details restricted by the security signal 1B directly acquired from the brake command unit 1, the brake control unit 4 does not perform control on the brake 20, that is, maintains the current state.

In the brake control system 30 illustrated in FIG. 1, the onboard devices perform communication with the train control and monitoring system 14 via Ethernet. As a result, the number of wires can be reduced a compared with the case of communication based on RS 485 in which Ethernet is not used. Furthermore, in the brake control system 30 illustrated in FIG. 1, the number of wires is increased for only a wire that directly connects the brake control unit 4 and the brake command unit 1 compared with a case where the brake control unit 4 communicates with the brake command unit 1 only via the train control and monitoring system 14. The brake control system 30 of the present embodiment can avoid malfunction due to unauthorized access while using Ethernet, by increasing the number of wires by one.

Figure 2:
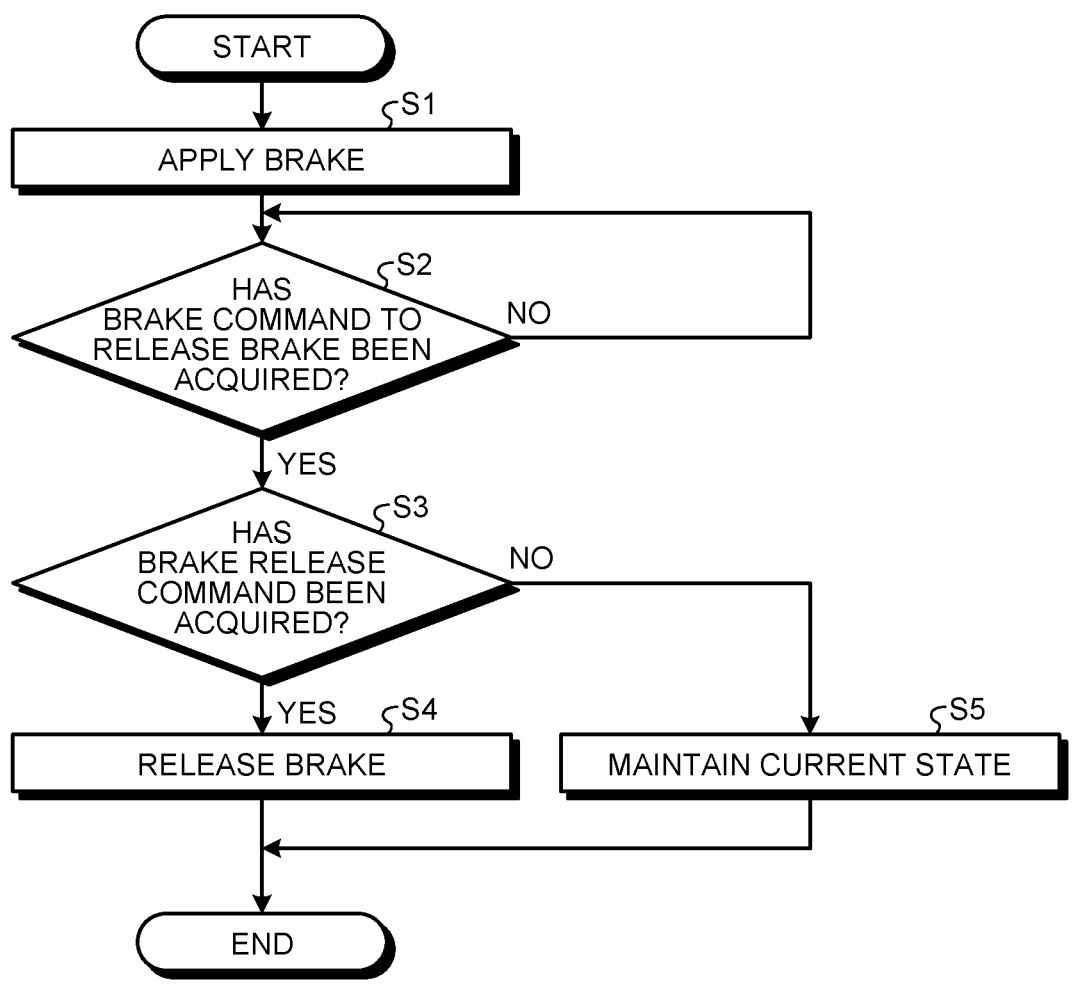
FIG. 2 is a flowchart illustrating operation to be performed by the brake control system according to the first embodiment at the time of power activation.

Operation of the brake control system 30 will be described with reference to a flowchart. FIG. 2 is a flowchart illustrating operation to be performed by the brake control system 30 according to the first embodiment at the time of power activation. In the brake control system 30, the control unit 42 of the brake control unit 4 applies the brake 20 at the time of power activation regardless of whether the brake command 1A has been acquired from the brake command unit 1 via the train control and monitoring system 14 (step S1). When the brake command 1A to release the brake 20 has not been acquired via the train control and monitoring system 14 through the acquisition unit 41 (step S2: NO), the control unit 42 waits until the brake command 1A to release the brake 20 is acquired. When acquiring the brake command 1A to release the brake 20 via the train control and monitoring system 14 through the acquisition unit 41 (step S2: Yes), the control unit 42 determines whether a brake release command has been directly acquired as the security signal 1B from the brake command unit 1 (step S3). When acquiring a brake release command as the security signal 1B from the brake command unit 1 via the acquisition unit 41 (step S3: Yes), the control unit 42 releases the brake 20 (step S4). When the control unit 42 has acquired no brake release command as the security signal 1B from the brake command unit 1 via the acquisition unit 41 (step S3: No), the control unit 42 maintains the current state of the brake 20 without releasing the brake 20, that is, while keeping the brake 20 working (step S5).

Figure 3:
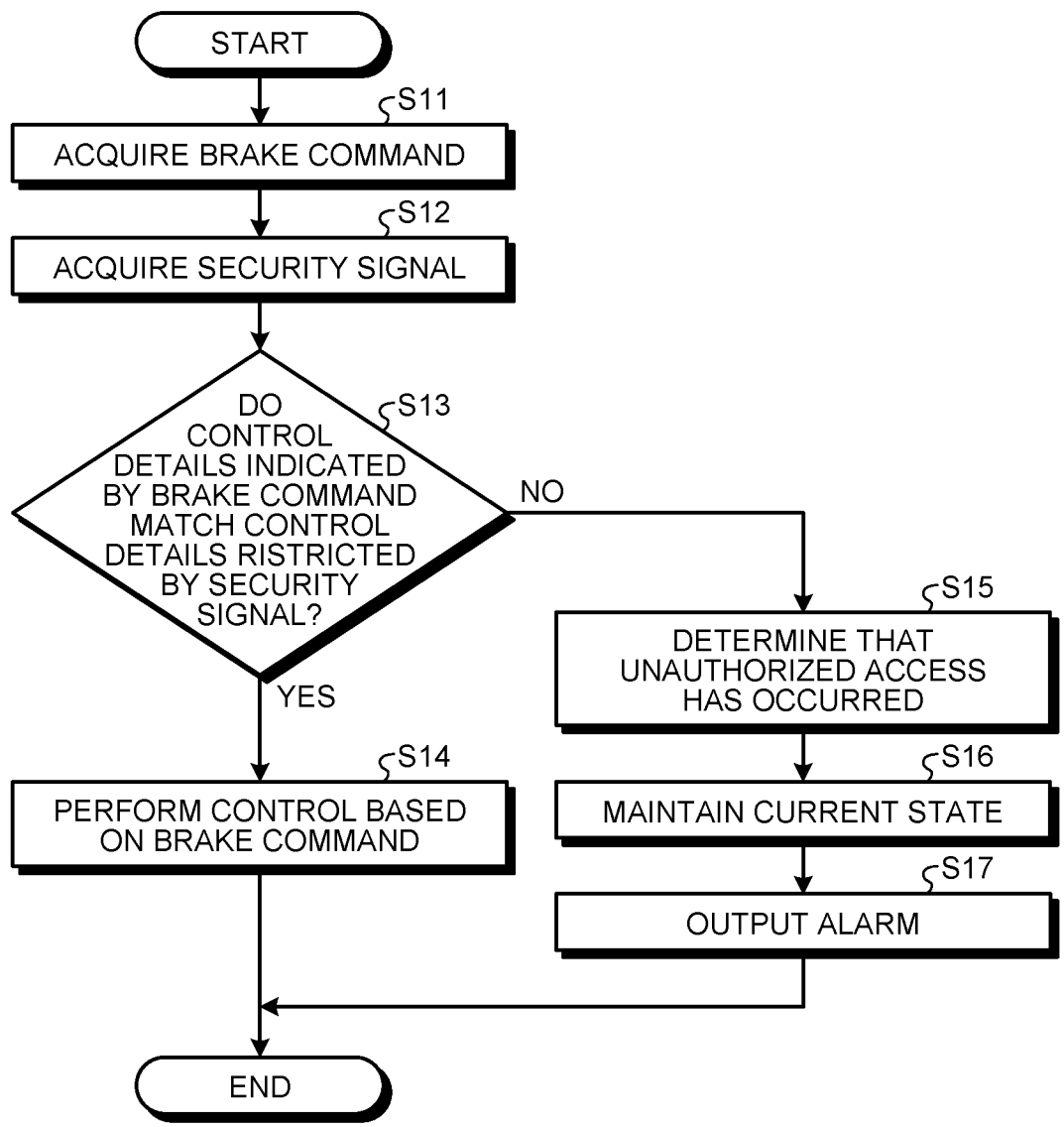
FIG. 3 is a flowchart illustrating operation to be performed by the brake control system according to the first embodiment during railroad car operation after the power activation.

FIG. 3 is a flowchart illustrating operation to be performed by the brake control system 30 according to the first embodiment during operation of the railroad car 100 after the power activation. In the brake control system 30, the control unit 42 of the brake control unit 4 acquires the brake command 1A from the brake command unit 1 via the train control and monitoring system 14 through the acquisition unit 41 (step S11). The control unit 42 directly acquires the security signal 1B from the brake command unit 1 via the acquisition unit 41 (step S12). The control unit 42 determines whether control details indicated by the brake command 1A match control details restricted by the security signal 1B (step S13). When the control details indicated by the brake command 1A match the control details restricted by the security signal 1B (step S13: Yes), the control unit 42 controls the brake 20 based on the control details indicated by the brake command 1A (step S14).

When the control details indicated by the brake command 1A do not match the control details restricted by the security signal 1B (step S13: No), the control unit 42 determines that unauthorized access has occurred (step S15), and does not perform, on the brake 20, control based on the control details indicated by the brake command 1A, that is, maintains the current state of the brake 20 (step S16). The control unit 42 outputs an alarm indicating that unauthorized access has occurred (step S17). As an alarm, the control unit 42 may provide display indicating that unauthorized access has occurred, on a display unit of the cab (not illustrated) of the railroad car 100, or may output a sound indicating that unauthorized access has occurred from a speaker of the cab (not illustrated) of the railroad car 100.

Note that, in the present embodiment, whether unauthorized access has occurred is determined by the brake command unit 1 and the brake control unit 4 as onboard devices that are installed on the railroad car 100 and control the brake 20, but the present invention is not limited thereto. In the railroad car 100, another onboard device may determine whether unauthorized access has occurred. For example, a command unit that gives an instruction on control details to an onboard device in an onboard device control system installed on the railroad car 100, outputs a first command by the first communication method, and also outputs a second command by the second communication method. The first command indicates details of control of an onboard device installed on the railroad car 100. The second command restricts details of control of the onboard device. A control unit that controls the onboard device acquires the first command by the first communication method via the train control and monitoring system 14, acquires the second command by the second communication method, and controls the onboard device based on the first command and the second command. In the above description, the first command corresponds to the brake command 1A described above, and the second command corresponds to the security signal 1B described above.

Next, a hardware configuration of the brake control system 30 will be described. In the brake control system 30, constituent elements other than the brake command unit 1 and the brake control unit 4 are implemented by devices to be installed on a general railroad car. The brake control unit 4 is implemented by processing circuitry. The processing circuitry may be a memory and a processor that executes programs stored in the memory, or may be dedicated hardware.

Figure 4:
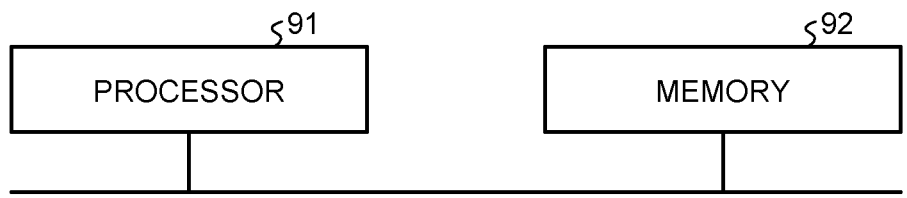
FIG. 4 is a diagram showing an example in which processing circuitry included in the brake control system according to the first embodiment includes a processor and a memory.

FIG. 4 is a diagram showing an example in which processing circuitry included in the brake control system 30 according to the first embodiment includes a processor and a memory. In a case where the processing circuitry includes a processor 91 and a memory 92, each function of the processing circuitry of the brake control system 30 is implemented by software, firmware, or a combination of software and firmware. The software or firmware is described as a program, and stored in the memory 92. The processor 91 reads and executes the program stored in the memory 92 to implement each function of the processing circuitry. That is, the processing circuitry includes the memory 92 for storing programs. As a result of execution of the programs, the brake control system 30 is caused to perform processing. In addition, it can also be said that these programs cause a computer to execute a procedure and a method for the brake control system 30.

Here, the processor 91 may be a central processing unit (CPU), a processing device, an arithmetic device, a microprocessor, a microcomputer, a digital signal processor (DSP), or the like. Furthermore, for example, a nonvolatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD) is applicable to the memory 92.

Figure 5:
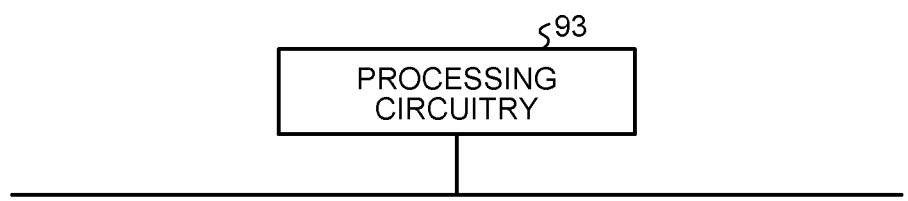
FIG. 5 is a diagram showing an example in which the processing circuitry included in the brake control system according to the first embodiment includes dedicated hardware.

FIG. 5 is a diagram showing an example in which the processing circuitry included in the brake control system 30 according to the first embodiment includes dedicated hardware. In a case where the processing circuitry includes dedicated hardware, for example, a single circuit, a composite circuit, a programmed processor, a parallel-programmed processor, an application specific integrated circuit (ASIC), a field programmable gate array (FPGA), or a combination thereof is applicable to processing circuitry 93 illustrated in FIG. 5. The functions of the brake control system 30 may be implemented by the processing circuitry 93 function by function. Alternatively, the functions of the brake control system 30 may be collectively Implemented by the processing circuitry 93.

Note that some of the functions of the brake control system 3D may be implemented by dedicated hardware, and some of the other functions thereof may be implemented by software or firmware. Thus, the processing circuitry can implement each of the above-described functions by means of dedicated hardware, software, firmware, or a combination thereof.

The hardware configuration of the brake control unit 4 has been described in detail. Meanwhile, the brake command unit 1 is also implemented by processing circuitry in the same manner. The processing circuitry may be a memory and a processor that executes programs stored in the memory, or may be dedicated hardware.

As described above, in the brake control system 30 according to the present embodiment, the brake control unit 4 controls the brake 20 based on the brake command 1A when control details indicated by the brake command 1A match control details restricted by the security signal 1B, and maintains the current state of the brake 20 when the control details indicated by the brake command 1A do not match the control details restricted by the security signal 1B. As a result, even when communication is performed via Ethernet in the railroad car 100 and the brake command 1A is transmitted via Ethernet, the brake control system 30 can avoid malfunction due to unauthorized access by using the security signal 1B transmitted by a communication method other than Ethernet.

Second Embodiment

In a second embodiment, a case will be described in which the brake control unit 4 determines that unauthorized access has occurred and stops operation of another onboard device when control details indicated by the brake command 1A do not match control details restricted by the security signal 1B.

Figure 6:
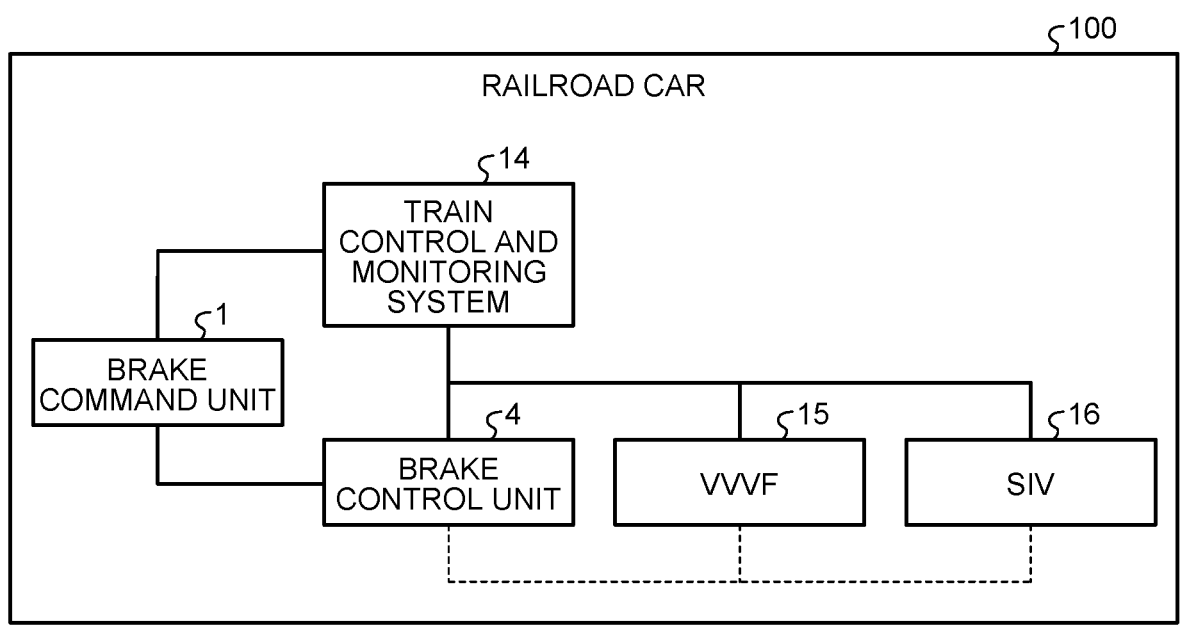
FIG. 6 is a diagram showing a configuration example of a railroad car including a brake control unit according to a second embodiment.

In the second embodiment, the configuration of the brake control system 30 is the same as that in the first embodiment. In the first embodiment, when determining that unauthorized access has occurred, the control unit 42 of the brake control unit 4 does not perform, on the brake 20, control based on the control details indicated by the brake command 1A. In such a case, it is assumed that unauthorized access to the other onboard devices may also have occurred in the brake control system 30. Therefore, when determining that unauthorized access has occurred, the control unit 42 of the brake control unit 4 stops operation of the other onboard devices. FIG. 6 is a diagram showing a configuration example of the railroad car 100 including the brake control unit 4 according to the second embodiment. In FIG. 6, a variable voltage variable frequency (VVVF) 15 and a static inverter (SIV) 16 correspond to the above-described other onboard devices. When determining that unauthorized access has occurred, the brake control unit 4 instructs the VVVF 15 and the SIV 16 to stop operation. At this time, the brake control unit 4 may instruct the VVVF 15 and the SIV 16 to stop operation via Ethernet, or may instruct the VVVF 15 and the SIV 16 to stop operation by using a dedicated communication line. In FIG. 6, solid lines connecting the brake control unit 4, the VVVF 15, and the SIV 15 indicate Ethernet communication lines, and dotted lines connecting the brake control unit 4, the VVVF 15, and the SIV 16 indicate dedicated communication lines. Note that when determining that unauthorized access has occurred, the brake control unit 4 does not necessarily need to instruct the SIV 16 to stop operation. Instead, the brake control unit 4 may instruct only the VVVF 15 to stop operation and cause railroad car devices other than the VVVF 15, including the SIV 16, to continue operation.

Figure 7:
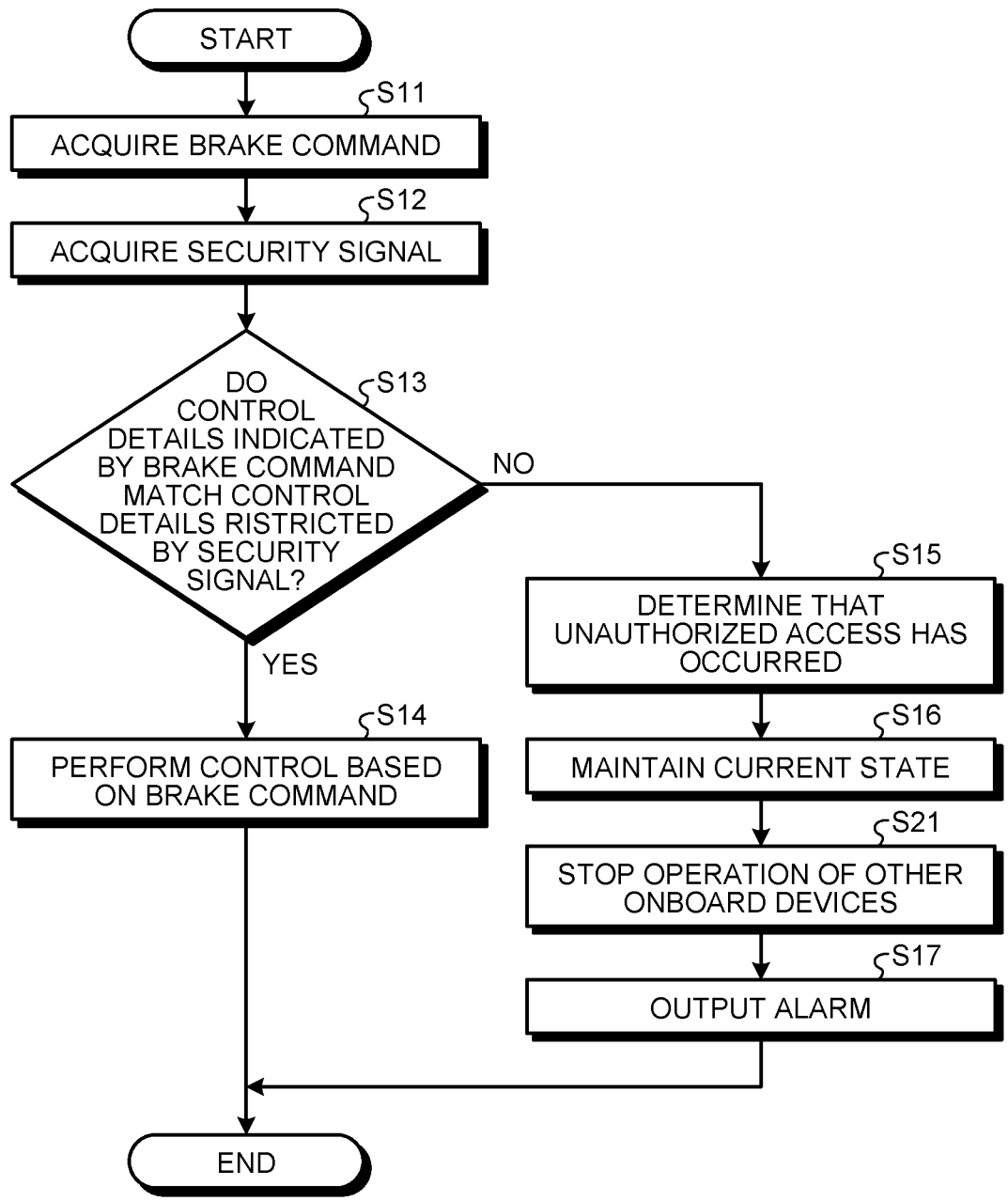
FIG. 7 is a flowchart illustrating operation to be performed by a brake control system according to the second embodiment during railroad car operation after power activation.

FIG. 7 is a flowchart illustrating operation to be performed by the brake control system 30 according to the second embodiment during operation of the railroad car 100 after power activation. In FIG. 7, operation to be performed in steps S11 to S16 is the same as the operation in the first embodiment illustrated in FIG. 3. After step S16, the control unit 42 further stops operation of the other onboard devices (step S21). The control unit 42 outputs an alarm indicating that unauthorized access has occurred (step S17). As described above, when control details indicated by the brake command 1A do not match control details restricted by the security signal 1B, the brake control unit 4 instructs the other onboard devices connected to the train control and monitoring system 14 to stop operation, directly or through Ethernet communication.

Note that, in the present embodiment, the brake control unit 4 determines whether unauthorized access has occurred, but the present embodiment is not limited thereto. At least either a constituent element that controls the VVVF 15 or a constituent element that controls the SIV 16 may determine whether unauthorized access has occurred, and cause the other onboard devices including the brake control unit 4 to stop operation when it is determined that unauthorized access has occurred.

As described above, according to the present embodiment, the brake control system 30 stops operation of other onboard devices of the railroad car 100 when determining that unauthorized access has occurred. As a result, the brake control system 30 can avoid malfunction of the other onboard devices of the railroad car 100 due to unauthorized access.

Third Embodiment

In the first and second embodiments, the brake control unit 4 directly communicates with the regenerative brake control unit 5. In a third embodiment, a case will be described in which the brake control unit 4 communicates with the regenerative brake control unit 5 via the train control and monitoring system 14 and in addition, communication between the brake control unit 4 and the train control and monitoring system 14 is duplicated.

Figure 8:
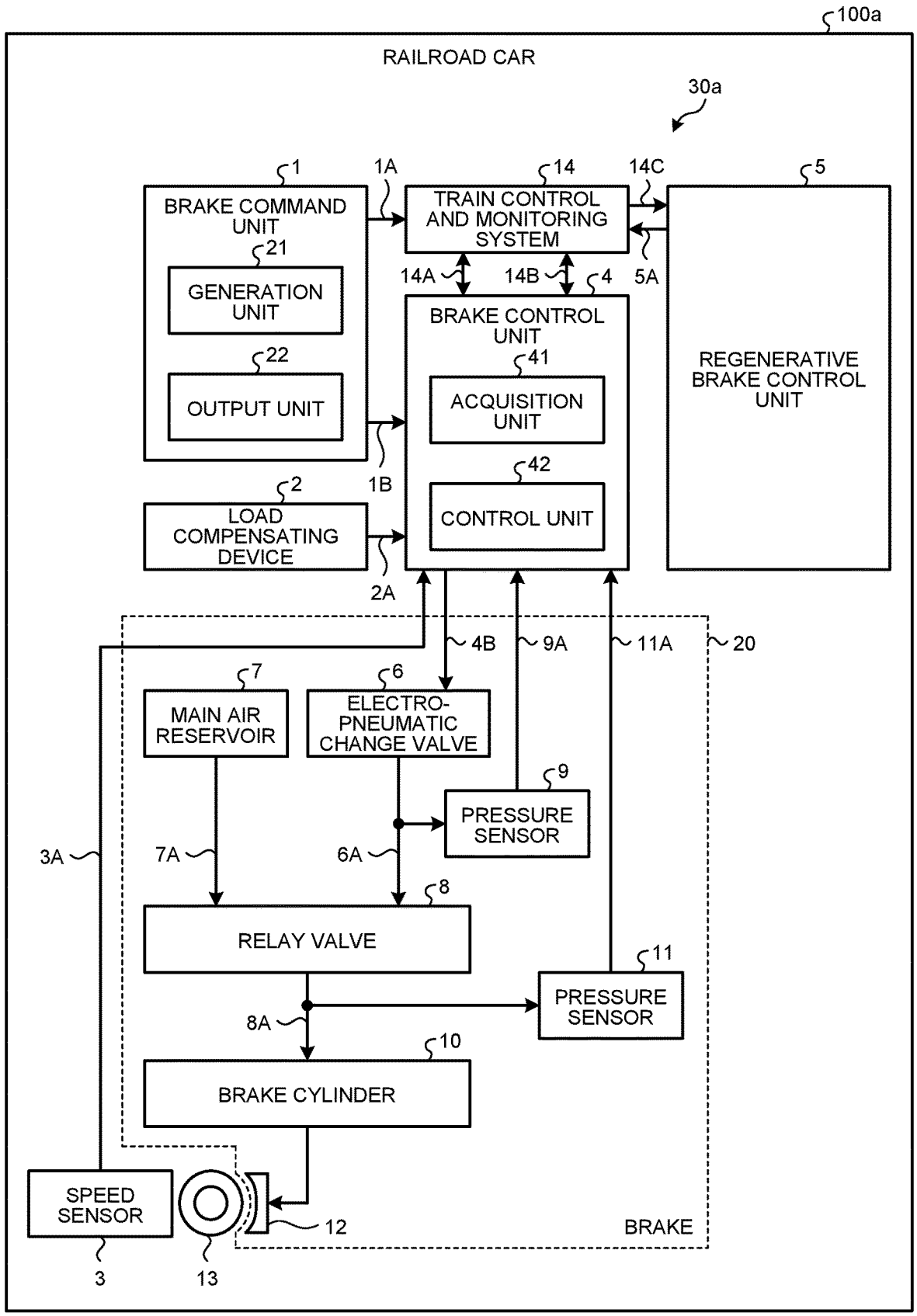
FIG. 8 is a diagram showing a configuration example of a brake control system according to a third embodiment.

FIG. 8 is a diagram showing a configuration example of a brake control system 30a according to the third embodiment. The brake control system. 30a is a system that is installed on a railroad car 100a, and controls the brake 20 of the railroad car 100a. The brake control system 30a is different from the brake control system 30 of the first embodiment in that the regenerative brake control unit 5 is connected to the train control and monitoring system 14 instead of the brake control unit 4 in the brake control system 30a. The brake control unit 4 outputs the regenerative pattern signal 4A in FIG. 1 to the train control and monitoring system 14 through Ethernet transmission 14A and 14B, The train control and monitoring system 14 outputs the regenerative pattern signal 4A in FIG. 1 to the regenerative brake control unit 5 through Ethernet transmission 14C. The regenerative brake control unit 5 outputs the regenerative feedback signal 5A to the train control and monitoring system 14. The train control and monitoring system 14 outputs the regenerative feedback signal 5A to the brake control unit 4 through the Ethernet transmission 14A and 14B.

Here, as illustrated in FIG. 8, communication between the brake control unit 4 and the train control and monitoring system 14 is communication through the Ethernet transmission 14A and 14B, that is, duplicated communication. In this case, the train control and monitoring system 14 also outputs the brake command 1A acquired from the brake command unit 1 to the brake control unit 4 through the Ethernet transmission 14A and 14B. Therefore, when control details indicated by at least either of the brake commands 1A acquired via the train control and monitoring system 14 through the Ethernet transmission 11A and 14B match control details restricted by the security signal 1B directly acquired from the brake command unit 1, the brake control unit 4 controls the brake 20 based on the brake command 1A indicating the matching control details.

FIG. 9 is a flowchart illustrating operation to be performed by the brake control system 30a according to the third embodiment after power activation. In the brake control system 30a, the control unit 42 of the brake control unit 4 acquires the brake commands 1A from the brake command unit 1 via the train control and monitoring system 14 and the acquisition unit 41 through the duplicated, that is, two transmission lines (step S31), The control unit 42 directly acquires the security signal 1B from the brake command unit 1 via the acquisition unit 41 (step S32). The control unit 42 determines whether control details indicated by at least either of the two brake commands 1A match control details restricted by the security signal 1B (step S33). When the control details indicated by at least either of the two brake commands 1A match the control details restricted by the security signal 1B (step S33: Yes), the control unit 42 determines whether the control details indicated by the two brake commands 1A match (step S34). When the control details indicated by the two brake commands 1A match (step S34: Yes), the control unit 42 control s the brake 20 based on the control details indicated by the brake commands 1A (step S35).

When it does not fall under the case where the control details indicated by at least either of the two brake commands 1A match the control details restricted by the security signal 1B (step S33: No), the control unit 42 determines that unauthorized access has occurred (step S36), and does not perform, on the brake 20, control based on the control details indicated by the brake commands 1A, that is, maintains the current state of the brake 20 (step S37). A case where it does not fall under the case where the control details indicated by at least either of the two brake commands 1A match the control details restricted by the security signal 1B (step S33: No) refers to a case where neither of the two brake commands 1A indicates control details matching the control details restricted by the security signal 1B. The control unit 42 outputs an alarm indicating that unauthorized access has occurred (step S38). Note that the control unit 42 may also stop operation of other onboard devices as in the second embodiment.

When the control details indicated by the two brake commands. 1A do not match (step S34: No), the control unit 42 controls the brake 20 based on the control details Indicated by the brake command 1A matching the control details restricted by the security signal (step S39). With regard to the brake command 1A indicating control details that do not match the control details restricted by the security signal 1B, the control unit 42 determines that unauthorized access has occurred (step S40). As in step S38, the control unit 42 may output an alarm indicating that unauthorized access has occurred.

Note that, in the present embodiment, the brake control system 30*a* has been described in which communication between the brake control unit 4 and the train control and monitoring system 14 is duplicated in a case where the brake control unit 4 communicates with the regenerative brake control unit 5 via the train control and monitoring system 14. However, the configuration is not limited thereto. The brake control system may be configured such that communication between the brake control unit 4 and the train control and monitoring system 14 is duplicated in a case where the brake control unit 4 directly communicates with the regenerative brake control unit 5 as in the first and second embodiments.

As described above, according to the present embodiment, when an Ethernet transmission section is duplicated, and the control details indicated by at least either of the two brake commands 1A match the control details restricted by the security signal 1B, the brake control system 30*a* controls the brake 20 based on the control details indicated by the brake command 1A matching the control details restricted by the security signal 1B. As a result, even if either of the two Ethernet transmission sections is subjected to unauthorized access, the brake control system 30*a* can control the brake 20 while avoiding malfunction due to unauthorized access as long as the other is not subjected to unauthorized access.

The configurations set forth in the above embodiments show examples of the subject matter of the present invention, and it is possible to combine the configurations with another technique that is publicly known, and is also possible to make omissions and changes to part of the configurations without departing from the gist of the present invention.

REFERENCE SIGNS LIST

1 brake command unit; 1A brake command; 1B security signal; 2 load compensating device; 2A load compensation signal; 3 speed sensor; 3A speed signal; 4 brake control unit; 4A regenerative pattern signal; 4B pressure control signal; 5 regenerative brake control unit; 5A regenerative feedback signal; 6 electropneumatic change valve; 6A air signal; 7 main air reservoir; 7A compressed air; 8 relay valve; 8A brake cylinder pressure; 9, 11 pressure sensor; 10 brake cylinder; 12 brake shoe; 13 wheel; 14 train control and monitoring system; 14A, 14B, 14C Ethernet transmission; 15 VVVF; 16 SIV; 20 brake; 21 generation unit; 22 output unit; 30, 30*a* brake control system; 41 acquisition unit; 42 control unit; 100, 100*a* railroad car.

The invention claimed is:

1. A brake control system to be installed on a railroad car, the system comprising:
  first processing circuitry to output a first brake command by a first communication method and output a second brake command by a second communication method different than the first communication method, the first brake command indicating details of control of a brake, the second brake command restricting details of control of the brake; and
  second processing circuitry to acquire the first brake command by the first communication method via third processing circuitry, acquire the second brake command by the second communication method, and control the brake based on a comparison between the first brake command and the second brake command.

2. The brake control system according to claim 1, wherein the second processing circuitry controls the brake based on the first brake command when the control details indicated by the first brake command match the control details restricted by the second brake command, and maintains a current state of the brake when the control details indicated by the first brake command do not match the control details restricted by the second brake command.

3. The brake control system according to claim 2, wherein in a case where the second processing circuitry applies the brake at a time of power activation, and acquires a command to release the brake as the first brake command from the third processing circuitry by the first communication method, the second processing circuitry maintains a current state of the brake when a brake release command is not acquired as the second brake command from the first processing circuitry by the second communication method, and releases the brake when the brake release command is acquired as the second brake command from the first processing circuitry by the second communication method.

4. The brake control system according to claim 3, wherein when the control details indicated by the first brake command do not match the control details restricted by the second brake command, the second processing circuitry instructs, directly or by the second communication method, another onboard device to stop operation, the another onboard device being connected to the third processing circuitry.

5. The brake control system according to claim 2, wherein when the control details indicated by the first brake command do not match the control details restricted by the second brake command, the second processing circuitry instructs, directly or by the second communication method, another onboard device to stop operation, the another onboard device being connected to the third processing circuitry.

6. The brake control system according to claim 1, wherein in a case where the second processing circuitry applies the brake at a time of power activation, and acquires a command to release the brake as the first brake command from the third processing circuitry by the first communication method, the second processing circuitry maintains a current state of the brake when a brake release command is not acquired as the second brake command from the first processing circuitry by the second communication method, and releases the brake when the brake release command is acquired as the second brake command from the first processing circuitry by the second communication method.

7. The brake control system according to claim 6, wherein when the control details indicated by the first brake command do not match the control details restricted by the second brake command, the second processing circuitry instructs, directly or by the second communication method, another onboard device to stop operation, the another onboard device being connected to the third processing circuitry.

8. The brake control system according to claim 1, wherein when the control details indicated by the first brake command do not match the control details restricted by the second brake command, the second processing circuitry instructs, directly or by the second communication method, another onboard device to stop operation, the another onboard device being connected to the third processing circuitry.

9. The brake control system according to claim 1, wherein communication between the second processing circuitry and the third processing circuitry is duplicated:

when control details indicated by at least either of two first brake commands acquired from the third processing circuitry match the control details restricted by the second brake command, the second processing circuitry controls the brake based on the at least either of the two first brake commands indicating the control details matching the control details restricted by the second brake command; and when neither of the two first brake commands acquired from the third processing circuitry indicates control details matching the control details restricted by the second brake command, the second processing circuitry maintains a current state of the brake.

10. The brake control system according to claim 1, wherein
the first communication method has a larger transmission capacity than the second communication method.

11. An onboard device control system to be installed on a railroad car, the system comprising:
fourth processing circuitry to output a first command by a first communication method and output a second command by a second communication method different than the first communication method, the first command indicating details of control of an onboard device installed on the railroad car, the second command restricting details of control of the onboard device; and
fifth processing circuitry to acquire the first command by the first communication method via sixth processing circuitry, acquire the second command by the second communication method, and control the onboard device based on a comparison between the first command and the second command.

12. A brake control method to be performed in a brake control system to be installed on a railroad car, the method comprising:
outputting a first brake command by a first communication method and outputting a second brake command by a second communication method different than the first communication method, the first brake command indicating details of control of a brake, the second brake command restricting details of control of the brake; and
acquiring the first brake command by the first communication method via a train control and monitoring system and the second brake command by the second communication method, controlling the brake based on a comparison between the first brake command and the second brake command.

13. The brake control method according to claim 12, wherein
in the acquiring, the brake is controlled based on the first brake command when the control details indicated by the first brake command match the control details restricted by the second brake command, and a current state of the brake is maintained when the control details indicated by the first brake command do not match the control details restricted by the second brake command.

14. The brake control method according to claim 13, wherein
in the acquiring, in a case where the brake is applied at a time of power activation, and a command to release the brake is acquired as the first brake command from the train control and monitoring system by the first communication method, a current state of the brake is maintained when a brake release command is not acquired as the second brake command by the second communication method, and the brake is released when the brake release command is acquired as the second brake command by the second communication method.

15. The brake control method according to claim 14, wherein
in the acquiring, when the control details indicated by the first brake command do not match the control details restricted by the second brake command, an instruction is issued to, directly or by the second communication method, another onboard device to stop operation, the another onboard device being connected to the train control and monitoring system.

16. The brake control method according to claim 13, wherein
in the acquiring, when the control details indicated by the first brake command do not match the control details restricted by the second brake command, an instruction is issued to, directly or by the second communication method, another onboard device to stop operation, the another onboard device being connected to the train control and monitoring system.

17. The brake control method according to claim 12, wherein
in the acquiring, in a case where the brake is applied at a time of power activation, and a command to release the brake is acquired as the first brake command from the train control and monitoring system by the first communication method, a current state of the brake is maintained when a brake release command is not acquired as the second brake command by the second communication method, and the brake is released when the brake release command is acquired as the second brake command by the second communication method.

18. The brake control method according to claim 17, wherein
in the acquiring, when the control details indicated by the first brake command do not match the control details restricted by the second brake command, an instruction is issued to, directly or by the second communication method, another onboard device to stop operation, the another onboard device being connected to the train control and monitoring system.

19. The brake control method according to claim 12, wherein
in the acquiring, when the control details indicated by the first brake command do not match the control details restricted by the second brake command, an instruction is issued to, directly or by the second communication method, another onboard device to stop operation, the another onboard device being connected to the train control and monitoring system.

20. The brake control method according to claim 12, wherein
communication regarding the train control and monitoring system is duplicated:
when control details indicated by at least either of two first brake commands acquired from the train control and monitoring system match the control details restricted by the second brake command, the brake is controlled in the acquiring based on the at least either of the two first brake commands indicating the control details matching the control details restricted by the second brake command; and when neither of the two first brake commands acquired from the train control and monitoring system indicates control details matching the control details restricted by the second brake command, a current state of the brake is maintained in the acquiring.

\* \* \* \* \*